(12) United States Patent
Ye et al.

(10) Patent No.: US 10,629,193 B2
(45) Date of Patent: Apr. 21, 2020

(54) ADVANCING WORD-BASED SPEECH RECOGNITION PROCESSING

(71) Applicant: Microsoft Technology Licensing, LLC, Redmond, WA (US)

(72) Inventors: Guoli Ye, Redmond, WA (US); James Droppo, Carnation, WA (US); Jinyu Li, Redmond, WA (US); Rui Zhao, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/917,082

(22) Filed: Mar. 9, 2018

(65) Prior Publication Data
US 2019/0279614 A1 Sep. 12, 2019

(51) Int. Cl.
*G10L 15/187* (2013.01)
*G10L 15/16* (2006.01)
*G10L 15/06* (2013.01)
*G10L 15/22* (2006.01)
*G10L 15/08* (2006.01)

(52) U.S. Cl.
CPC .......... *G10L 15/187* (2013.01); *G10L 15/063* (2013.01); *G10L 15/08* (2013.01); *G10L 15/16* (2013.01); *G10L 15/22* (2013.01); *G10L 2015/0635* (2013.01); *G10L 2015/223* (2013.01)

(58) Field of Classification Search
CPC ..... G10L 15/187; G10L 15/063; G10L 15/16; G10L 15/22; G10L 2015/0635; G10L 2015/223
USPC ........................................... 704/232
See application file for complete search history.

(56) References Cited

U.S. PATENT DOCUMENTS 10,002,301 B1 * 6/2018 Mahmoud ................. G06T 7/11
10,229,672 B1 * 3/2019 Rao .......................... G10L 15/16
(Continued)

OTHER PUBLICATIONS

Amodei, et al., "Deep speech 2: End-to-end speech recognition in English and Mandarin", In Journal of Computing Research Repository, Dec. 2015, pp. 1-28.
(Continued)

*Primary Examiner* — Edwin S Leland, III

(57) ABSTRACT

Non-limiting examples of the present disclosure describe advancements in acoustic-to-word modeling that improve accuracy in speech recognition processing through the replacement of out-of-vocabulary (OOV) tokens. During the decoding of speech signals, better accuracy in speech recognition processing is achieved through training and implementation of multiple different solutions that present enhanced speech recognition models. In one example, a hybrid neural network model for speech recognition processing combines a word-based neural network model as a primary model and a character-based neural network model as an auxiliary model. The primary word-based model emits a word sequence, and an output of character-based auxiliary model is consulted at a segment where the word-based model emits an OOV token. In another example, a mixed unit speech recognition model is developed and trained to generate a mixed word and character sequence during decoding of a speech signal without requiring generation of OOV tokens.

20 Claims, 7 Drawing Sheets

(56) References Cited

U.S. PATENT DOCUMENTS

| | | | |
|---|---|---|---|
| 2014/0218299 | A1* | 8/2014 | Kataoka .............. G06F 3/04883 345/168 |
| 2018/0174580 | A1* | 6/2018 | Kim ...................... G10L 15/197 |
| 2018/0232632 | A1* | 8/2018 | Kaskari .................. G06N 3/049 |
| 2018/0268023 | A1* | 9/2018 | Korpusik ............ G06F 17/2785 |
| 2018/0322866 | A1* | 11/2018 | Li ........................ G10L 15/193 |
| 2018/0322867 | A1* | 11/2018 | Li ........................ G10L 15/187 |
| 2019/0189111 | A1* | 6/2019 | Watanabe ............... G10L 15/02 |
| 2019/0189115 | A1* | 6/2019 | Hori ........................ G10L 15/16 |

OTHER PUBLICATIONS

Audhkhasi, et al., "Direct acoustics-to-word models for English conversational speech recognition", In Journal of Computing Research Repository, Mar. 2017, 5 Pages.

Battenberg, et al., "Exploring neural transducers for end-to-end speech recognition.", In Proceedings of IEEE Automatic Speech Recognition and Understanding Workshop, Dec. 16, 2017, 8 Pages.

Chan, et al., "Listen, attend and spell", In Journal of Computing Research Repository, Aug. 2015, pp. 1-16.

Chorowski, et al., "Attention-based models for speech recognition", In Journal of Advances in Neural Information Processing Systems, Jun. 24, 2015, pp. 1-19.

Li, et al., "Acoustic-To-Word Model Without Oov", In Proceedings of IEEE Automatic Speech Recognition and Understanding Workshop, Dec. 16, 2017, 6 Pages.

Graves, et al., "Connectionist temporal classification: labelling unsegmented sequence data with recurrent neural networks", In Proceedings of the 23rd international conference on Machine learning, Jun. 25, 2006, 8 Pages.

Graves, et al., "Hybrid speech recognition with Deep Bidirectional LSTM", In Proceedings of IEEE Workshop on Automatic Speech Recognition and Understanding, Dec. 2013, pp. 273-278.

Graves, Alex, "Sequence transduction with recurrent neural networks", In Journal of Computing Research Repository, Nov. 2012, 9 Pages.

Graves, et al., "Speech Recognition with Deep Recurrent Neural Networks", In Proceedings of IEEE International Conference on Acoustics, Speech and Signal Processing, May 26, 2013, pp. 6645-6649.

Hannun, et al., "Deep speech: Scaling up end-to-end speech recognition", In Journal of Computing Research Repository, Dec. 17, 2014, pp. 1-12.

Hochreiter, et al., "Long Short-Term Memory", In Journal of Neural Computation, vol. 9, Issue 8, Nov. 15, 1997, pp. 1735-1780.

Kingsbury, et al., "Scalable minimum Bayes risk training of deep neural network acoustic models using distributed Hessian-free optimization", In Proceedings of 13th Annual Conference of the International Speech Communication Association, Sep. 9, 2012, pp. 10-13.

Li, et al., "Constructing long short-term memory based deep recurrent neural networks for large vocabulary speech recognition", In Proceedings of IEEE International Conference on Acoustics, Speech and Signal Processing, Apr. 19, 2015, 5 Pages.

Zweig, et al., "Advances in all-neural speech recognition", In Proceedings of IEEE International Conference on Acoustics, Speech and Signal Processing, Mar. 5, 2017, 5 Pages.

Liu, et al., "Gram-CTC: Automatic unit selection and target decomposition for sequence labelling", In Proceedings of Proceedings of the 34th International Conference on Machine Learning, Aug. 2017, 10 Pages.

Luong, et al., "Achieving open vocabulary neural machine translation with hybrid word-character models", In Proceedings of the 54th Annual Meeting of the Association for Computational Linguistics, Aug. 7, 2016, 11 Pages.

Miao, et al., "An empirical exploration of ctc acoustic models", In Proceedings of IEEE International Conference on Acoustics, Speech and Signal Processing, Mar. 20, 2016, 5 Pages.

Miao, et al., "Eesen: End-to-end speech recognition using deep RNN models and WFST-based decoding", In Proceedings of IEEE Workshop on Automatic Speech Recognition and Understanding, Dec. 13, 2015, 8 Pages.

Miao, et al., "Simplifying long short-term memory acoustic models for fast training and decoding", In Proceedings of IEEE International Conference on Acoustics, Speech and Signal Processing, Mar. 20, 2016, pp. 2284-2288.

Prabhavalkar, et al., "A comparison of sequence-to-sequence models for speech recognition", In Proceedings of 18th Annual Conference of the International Speech Communication Association, Aug. 20, 2017, pp. 939-943.

Pundak, et al., "Lower frame rate neural network acoustic models", In Proceedings of 17th Annual Conference of the International Speech Communication Association, Sep. 8, 2016, pp. 22-26.

Sainath, et al., "Convolutional, long short-term memory, fully connected deep neural networks", In Proceedings of IEEE International Conference on Acoustics, Speech and Signal Processing, Apr. 19, 2015, 5 Pages.

Sak, et al., "Fast and accurate recurrent neural network acoustic models for speech recognition", In Proceedings of 16th Annual Conference of the International Speech Communication Association, Sep. 6, 2015, 5 Pages.

Sak, et al., "Learning acoustic frame labeling for speech recognition with recurrent neural networks", In Proceedings of IEEE International Conference on Acoustics, Speech and Signal Processing, Apr. 19, 2015, 5 Pages.

Sak, et al., "Sequence discriminative distributed training of long short-term memory recurrent neural networks", In Proceedings of 15th Annual Conference of the International Speech Communication Association, Sep. 14, 2014, pp. 1209-1213.

Senior, et al., "Acoustic modelling with CD-CTC-SMBR LSTM RNNs", In Proceedings of IEEE Workshop on Automatic Speech Recognition and Understanding, Dec. 13, 2015, 6 Pages.

Senior, et al., "Long short-term memory recurrent neural network architectures for large scale acoustic modeling", In Proceedings of Fifteenth Annual Conference of the International Speech Communication Association, Sep. 14, 2014, pp. 338-342.

Soltau, et al., "Neural speech recognizer: Acoustic-to-word LSTM model for large vocabulary speech recognition", In Journal of Computing Research Repository, Oct. 31, 2016, pp. 1-6.

Su, et al., "Error Back Propagation for Sequence Training of Context-Dependent Deep Networks for Conversational Speech Transcription", In Proceedings of the IEEE International Conference on Acoustics, Speech and Signal Processing, May 26, 2013, pp. 6664-6668.

Veselý, et al., "Sequence-discriminative training of deep neural networks", In Proceedings of 14th Annual Conference of International Speech Communication Association, Aug. 25, 2013, pp. 2345-2349.

Yu, et al., "An introduction to computational networks and the computational network toolkit", In Microsoft Technical Report MSR-TR-2014-112, Aug. 2014, 180 Pages.

Yu, et al., "Recent progresses in deep learning based acoustic models", In Proceedings of IEEE/CAA Journal of Automatica Sinica, vol. 4, No. 3, Jul. 2017, pp. 400-413.

Zhang, et al., "Very deep convolutional networks for end-to-end speech recognition", In Proceedings of IEEE International Conference on Acoustics, Speech and Signal Processing, Mar. 5, 2017, 5 Pages.

Gers, et al., "Learning to Forget: Continual Prediction with LSTM", In Journal of Neural Computation, vol. 12, No. 10, Sep. 7, 1999, 20 Pages.

* cited by examiner

100

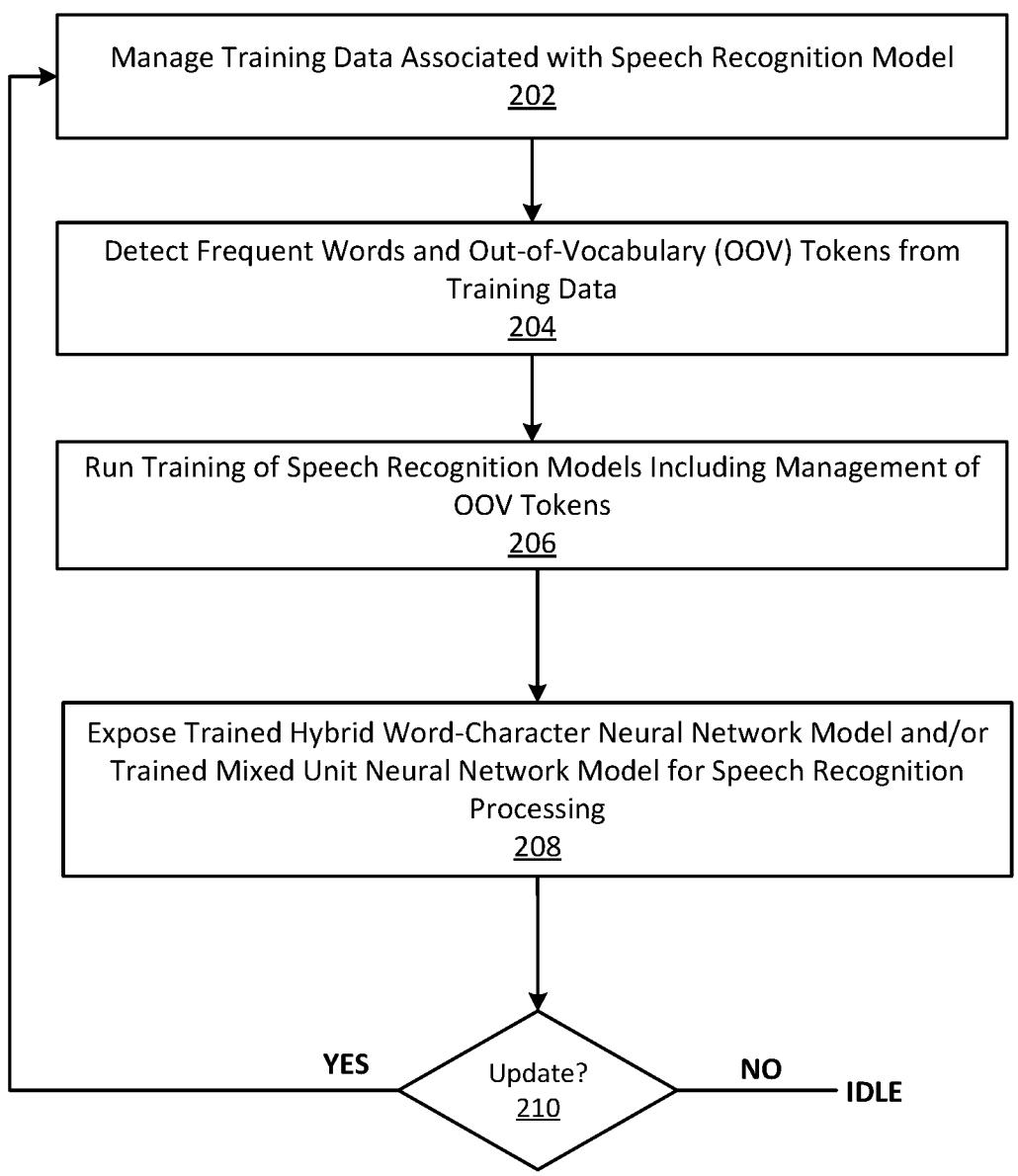

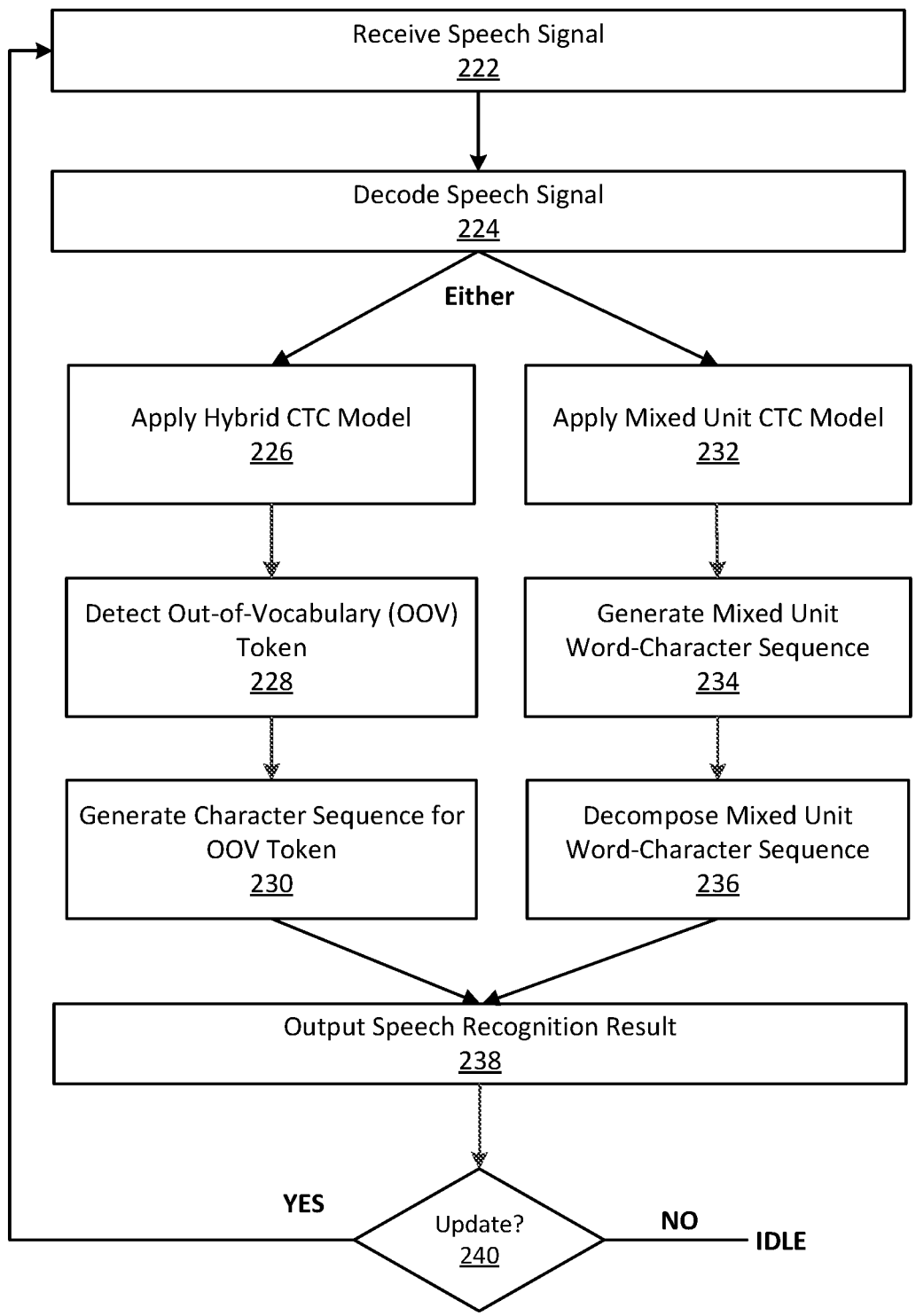

ical issue of word-based modeling is that such models are not equipped to handle hot-words, which emerge and become popular after the network has been built. For instance, specific words or phrases may become normal speech that are not initially recognized by a trained word model. It is impossible to get satisfactory performance by directly adding output nodes in the network with the specified hot-words without retraining the network.

ADVANCING WORD-BASED SPEECH RECOGNITION PROCESSING

BACKGROUND

Speech recognition processing is used to enable recognition and translation of spoken language into text. Applications and services may utilize a speech recognition result to enhance processing and productivity. A goal of speech recognition processing (e.g., automatic speech recognition (ASR)) is to generate a word sequence from a speech acoustic. In doing so, a word unit is the most natural output unit for network modeling. Accuracy and precision in determining words from speech acoustics is not very good if the training data amount is not huge, partially due to the high out-of-vocabulary (OOV) rate. There are many challenges when working solely with word-based modeling for speech recognition processing. A first technical issue relates to detection and processing of OOV tokens. Only frequent words in a training set are used as the targets and the remaining words are just tagged as OOV tokens. These OOV tokens cannot be modeled and cannot be recognized during decoding evaluation. This causes inaccurate and incomplete results during speech signal decoding. This can be recognized when speech recognition detection fails to identify (or misses) spoken words by a user. Another technical issue of word-based modeling is that such models are not equipped to handle hot-words, which emerge and become popular after the network has been built. For instance, specific words or phrases may become normal speech that are not initially recognized by a trained word model. It is impossible to get satisfactory performance by directly adding output nodes in the network with the specified hot-words without retraining the network.

SUMMARY

In view of the foregoing technical shortcomings, non-limiting examples of the present disclosure describe advancements in acoustic-to-word modeling that improve accuracy in speech recognition processing through the replacement of out-of-vocabulary (OOV) tokens. During the decoding of speech signals, accuracy in speech recognition processing can be achieved through training and implementation of multiple different solutions that present enhanced speech recognition models. Examples described herein are applicable to any speech recognition processing including automatic speech recognition (ASR).

In one example, a hybrid neural network model for speech recognition processing combines a word-based neural network model as a primary model and a character-based neural network model as an auxiliary model. During decoding of a speech signal, the primary word-based model emits a word sequence, and the output of the character-based auxiliary model is consulted at a segment where the word-based model emits an OOV token. In another example, a mixed unit speech recognition model is developed and trained to generate a mixed word and character sequence. Instead of generating and replacing an OOV token during decoding of a speech signal, detection and replacement of OOV tokens is done during training. In this way, there is no OOV generated during decoding. The sequence generated during decoding is a mixture word and character sequence. A significant reduction in word error rate (WER) is achieved over previously existing word-based modeling when utilizing the current solutions described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 2A-2B illustrates exemplary methods respectively related to training of speech recognition modeling and application of a trained speech recognition model for decoding a speech signal, with which aspects of the present disclosure may be practiced.

DETAILED DESCRIPTION

Figure 1:
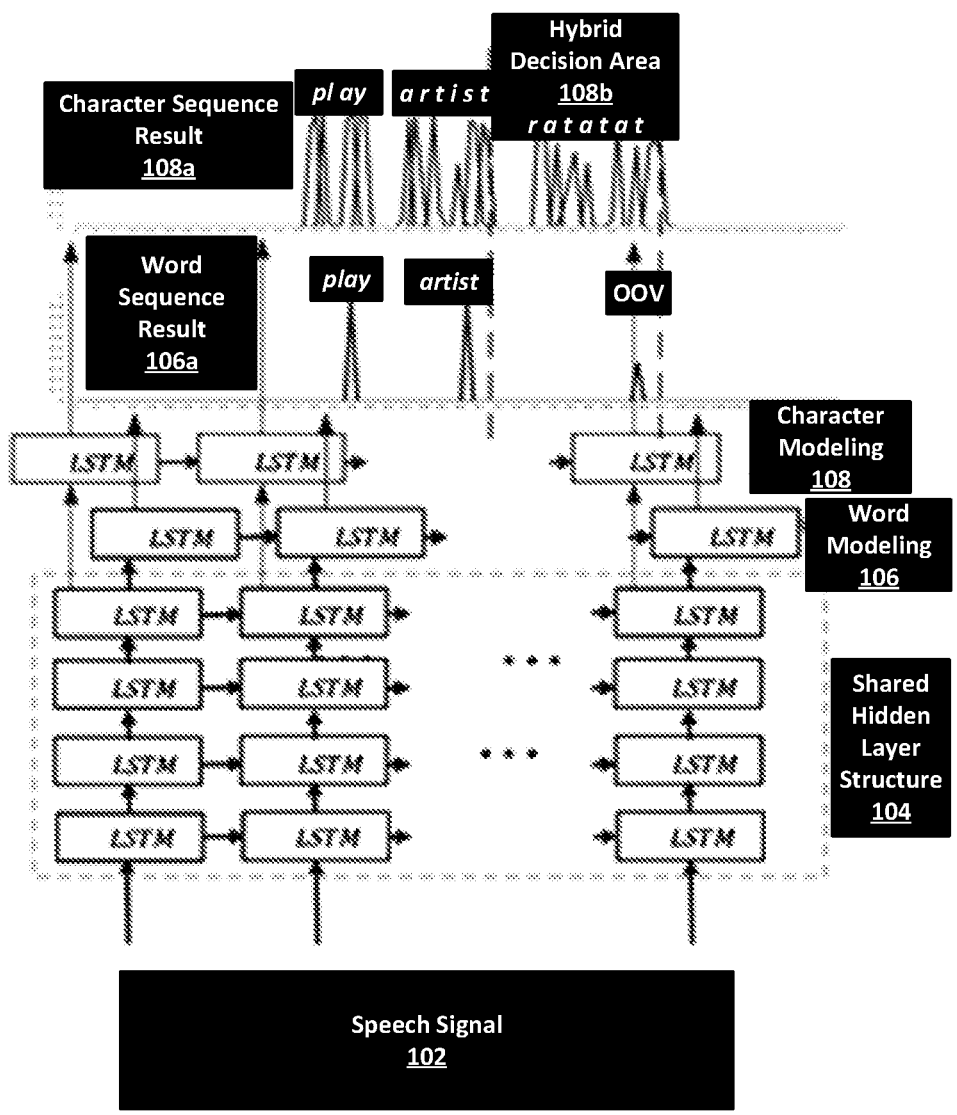
FIG. 1 illustrates an exemplary processing flow related to detection and replacement of out-of-vocabulary tokens during decoding of a speech signal, with which aspects of the present disclosure may be practiced.

Non-limiting examples of the present disclosure describe advancements in acoustic-to-word modeling that improve accuracy in speech recognition processing through the replacement of out-of-vocabulary (OOV) tokens. An OOV token corresponds to a portion of a speech signal that is out of a vocabulary (i.e., an infrequent word) of a trained speech recognition model. During the decoding of speech signals, accuracy in speech recognition processing can be achieved through training and implementation of multiple different solutions that present enhanced speech recognition models. Examples described herein are applicable to any speech recognition processing including automatic speech recognition (ASR).

In one example, a hybrid neural network model for speech recognition processing combines a word-based neural network model as a primary model and a character-based neural network model as an auxiliary model. During the decoding of a speech signal, the primary word-based model emits a word sequence, and the output of the character-based auxiliary model is consulted at a segment where the word-based model emits an OOV token. An example of a hybrid neural network model is Connectionist Temporal Classification (CTC) modeling that is adapted to resolve OOV tokens, which may be generated from word-based analysis. A CTC model is a type of neural network output and associated scoring function, for training recurrent neural networks (RNNs) such as long short-term memory (LSTM) networks to tackle sequence problems where timing is variable. Timing is a key variable in evaluation of speech signals for the detection of specific words in accordance with a time overlap. A CTC model maps input speech input frames into an output label sequence. To deal with the issue that the number of output labels is smaller than that of input speech frames, CTC introduces a special blank label and allows the repetition of labels to map the label sequence into a CTC path, which forces the output and input sequences to have the same length. CTC output labels may be phonemes, characters or even words. Exemplary CTC models may be bi-directional LSTM models.

Processing operations described herein build upon general knowledge related to building and training of neural networks models, which is known to one skilled in the field of art. While CTC modeling is referenced herein for ease of understanding, it is to be further understood that processing operations described herein may be used to adapt other types of speech recognition modeling for the advancement of speech recognition processing.

An exemplary hybrid neural network model for speech recognition processing (e.g., hybrid CTC model) improves the accuracy of a word-based neural network model because OOV tokens, generated from the word-based modeling, are replaced without changing any other word outputs. An exemplary shared-hidden-layer structure enables the alignments of words from the word-based modeling to be well synchronized with character-based modeling that is used to replace OOV tokens. Further, because the character-based modeling is configured to generate any word without revisiting model training, issues pertaining to hot-words (described in the background) are also adequately addressed. For example, during testing, hot-words may be added to a valid word listing and subsequently used to assist with word and character mapping.

In another example, a mixed unit speech recognition model is developed and trained to generate a mixed word and character sequence during decoding of a speech signal. Instead of generating and replacing an OOV token during decoding of a speech signal, detection and replacement of OOV tokens is done during training. In this way, there is no OOV generated during decoding. The sequence generated during decoding is a mixed word and character sequence. A generated mixed unit, that comprises a mix of word(s) and character sequence(s), may be decomposed to separate words from character sequences. A character sequence may further be collapsed (into words) to refine a speech recognition result. An exemplary mixed unit speech recognition model may be a mixed-CTC model or other neural network model, that is trained based on the combination of words and character sequences (e.g., sequences of multi-letters).

Accordingly, the present disclosure provides a plurality of technical advantages, among other benefits, that include but are not limited to: improved efficiency related to automatic speech recognition; adaptation of general word-based speech recognition models to exemplary models described herein; improved training for speech recognition models; improved accuracy and precision in speech-to-text processing as well as a reduction in word error rate (WER); modeling that addresses synchronization issues with word and character evaluation; improved processing efficiency of applications/services and associated computing devices through stream-lining of downstream processing of speech signals as input; improved processing efficiency of computing devices associated with speech detection processing including a reduction in processing cycles and latency through minimization of the amount of queries being received during (or to correct) speech recognition processing as well as better management of storage/memory of computing devices that are utilized for processing operations described herein; improving cross-application usage and productivity between applications/services (e.g., productivity services); and improved user interaction and productivity with front-end user interfaces and associated applications/services, among other examples.

FIG. 1 illustrates an exemplary processing flow 100 related to detection and replacement of OOV tokens during decoding of a speech signal, with which aspects of the present disclosure may be practiced. An exemplary model, implementing process flow 100, is a hybrid neural network model for speech recognition processing, which combines a word-based neural network model as a primary model and a character-based neural network model as an auxiliary model. Process flow 100 further comprises a graphical representation of processing by the hybrid neural network model for speech recognition processing, where the graphical representation is illustrated in the word sequence result 106a and the character sequence result 108a (as well as the hybrid decision area 108b). Process flow 100 focuses on implementation of a hybrid neural network model for speech recognition processing.

As referenced above, an exemplary mixed unit speech recognition model may be trained and implemented as an alternative solution to resolving OOV token issues using a hybrid neural network model for speech recognition processing. Refer to subsequent description related to FIGS. 2A-2B for additional description for training and application of an exemplary mixed unit speech recognition model.

An exemplary hybrid neural network model may be utilized during ASR processing, for example, to enhance accuracy in speech recognition detection as well as reduce WER when compared to traditional word-based modeling for speech recognition. In one example, the hybrid neural network model is a hybrid CTC model as referenced in the foregoing description. Significant progress has been made in ASR when acoustic models trained with feed-forward deep neural networks switched to LSTM RNNs since the latter can better model speech sequences. As referenced above, CTC modeling is utilized to map speech input frames into an output label sequence. When working with speech frames as input in speech recognition tasks, CTC introduces a special blank label and allows for repetition of labels to force the output and input sequences to have the same length. This is optimal for time evaluation of specific portions of frames. CTC modeling outputs are usually dominated by blank symbols and the output tokens corresponding to the non-blank symbols usually occur with spikes in respective posteriors. Greedy decoding is a decoding strategy used to generate ASR outputs from CTC modeling, where non-blank tokens corresponding to the posterior spikes are concatenated and subsequently collapsing those tokens into word outputs if needed. Examples described herein may be configured to utilize greedy decoding but are not so limited, where examples may also utilize other decoding schemes known to one skilled in the field of art.

As the goal of ASR is to generate a word sequence from speech acoustics, word is the most natural output unit for network modeling. However, a challenge with solely word-based modeling is the OOV issue, where OOV tokens are generated for non-frequently recognized words. Many word-based models are trained to identify frequent words, where other words (not recognized by the training data) are just tagged as OOV (OOV tokens). Generally, content associated with OOV tokens is not recognizable during evaluation and is not further modeled. This results in incomplete speech signal predictions and further requires neural network models to be re-trained to recognize new words, which is both costly financially and resource-wise. To solve this OOV issue plaguing word-based CTC modeling, the present disclosure presents a first solution that comprises hybrid CTC modeling, which uses the output from word-based CTC modeling as the primary ASR result and consults letter-based CTC modeling at the segment level where the word-based CTC emits an OOV token. A received speech signal may be analyzed and synchronized for both word-based and character-based evaluation. Depending on results of the processing, the speech signal may be decoded based on one or more of a word-based and character-based evaluation. It is to be understood that some processing results of an exemplary hybrid neural network model for speech recognition processing may generate a speech recognition result without detecting (and subsequently replacing) OOV tokens from the speech signal. However, examples described herein reduce output of OOV tokens during speech recognition processing.

Process flow 100 begins at processing operation 102, where a speech signal is received and processed by an exemplary hybrid neural network model. An exemplary speech signal is a digital representation of a spoken utterance. Examples described herein reference evaluation of speech signals. However, it is to be understood that processing described herein can extend to working with any type of audio signal. A speech signal may be received from a computing device and/or application/service that is configured for speech recognition processing. Processing for receiving a speech signal as an input (including ASR processing) is known to one skilled in the field of art.

Non-limiting examples of applications/services that may be configured for speech recognition processing comprise productivity services and/or digital assistance services. An exemplary productivity application/service is an application/service configured for execution to enable users to complete tasks on a computing device (e.g., task execution through artificial intelligence (AI)). Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, directory applications/services, mapping services, calendaring services, electronic payment services, digital storage applications/services, digital assistant services and social networking applications/services, among other examples. In some examples, an exemplary productivity application/service may be a component of a suite of productivity applications/services that may be configured to interface with other applications/services associated with a platform. For example, a word processing service may be included in a bundled service (e.g., Microsoft® Office365® or the like). Further, an exemplary productivity service may be configured to interface with other internet sources/services including third-party application/services, for example, to enhance functionality of the productivity service.

A received speech signal (processing operation 102) is propagated to a shared hidden layer structure 104 (of the hybrid neural network model) for initial abstraction of the speech signal. The shared hidden layer structure 104 is a grouping of two or more neural network layers that abstracts the speech signal for subsequent processing by the word-based modeling 106 and character-based modeling 108 of the hybrid neural network model for speech recognition processing. A shared-hidden-layer structure 104 is used to align word segments of the speech signal between word-based CTC modeling and character-based CTC modeling, so that an OOV token algorithm may be executed to replace detected OOV tokens. An exemplary hybrid CTC model is configured to run the word-based and character-based CTCs simultaneously during testing by using the shared-hidden-layer constraint to help the time synchronization of word outputs from those two CTC models. As the length of output labels is shorter than the length of input speech frames associated with a speech signal, a CTC path is introduced to have the same length as the input speech frames by adding the blank symbol as an additional label and allowing repetition of labels. In execution, blank symbols tend to dominate most of the input frames, creating a challenge for synchronization between words and characters, where the shared hidden layer structure 104 is used to resolve this through synchronization of data for parallel processing by the different CTC models. Portions of the speech signal may be analyzed and labeled for subsequent evaluation by a word-based CTC and a character-based CTC, for example, to assist with frame reference and timing for identification of OOV tokens and subsequent character-based evaluation.

In one example, the hybrid neural network model has four shared hidden LSTM layers (shared hidden layer structure 104), on top of which the word-based CTC and the character-based CTC have one hidden LSTM layer and one softmax layer. However, it is to be understood that the present disclosure is not so limited to a specific number of shared hidden layers and an exemplary hybrid neural network model for speech recognition processing may comprise any number of shared hidden layers (e.g., N number of layers). It is to be understood that additional layers added to a shared hidden layer structure 104 may correlate to a higher level of abstraction of a speech signal. An optimal number of shared hidden layers may be determined with regard to processing efficiency and available network resources. Generation and management of exemplary layers of a neural network model (including LSTM and softmax layers) are known to one skilled in the field of art.

One drawback of standard CTC training is alignment of time data for predictions of a speech signal. This is because CTC relies only on one hidden feature to make the current prediction or labeling associated with a frame. Implementation of an exemplary shared hidden layer structure 104 overcomes such alignment issues by producing one or more context vectors, which take into account a plurality of hidden features for synchronization of frames associated with a speech signal. Hidden features for attention modeling may vary and are determined through training and evaluation of training data. Context vectors may be generated as time convolution features to assist with synchronization of word and character modeling. An exemplary context vector is a weighted sum of the most relevant hidden features within a context window that is used to analyze a specific portion of a speech signal. An exemplary context vector may be computed by convolving one or more hidden features with learnable weight matrices across time. An exemplary context vector is related to an output (used for subsequent modeling) using a softmax operation. A resulting context vector is utilized to make a prediction (or predictions) for labeling of frame data (e.g., time-based demarcation) associated with a speech signal. Such an output assists subsequent neural network modeling layers (e.g., word-based modeling 106 and character-based modeling 108) to detect words and characters in association with specific timing of a speech signal.

Moreover, performance of exemplary attention modeling may be further applied to provide more reliable content information. The shared hidden layer structure 104 may be configured to employ an attention model (e.g., CTC attention model) for the generation of context vectors as well as computation of weighting for hidden features being evaluated by the attention model. This is possible by introducing another recurrent network that can utilize content from several time steps in the past. This network, in essence, would learn an implicit language model (LM) that is trained to evaluate speech signals on a word-level as well as a character-level. Such modeling is particularly useful in detecting phonemes in speech signals, where past modeling is useful in detection of similar sounding phonemes, words, sequences, etc.

Process flow 100 may propagate output from the shared hidden layer structure 104 for word-based modeling 106 and character-based modeling 108 (if needed). As referenced above, word-based modeling 106 (e.g., word-based CTC) and the character-based modeling 108 (e.g., character-based CTC) each may comprise one or more individual hidden LSTM layers and one or more softmax layers. However, it is to be understood that the number of LSTM and/or softmax layers may vary for respective modeling portions of the hybrid neural network model. In one example, bottom hidden layers of a word-CTC are frozen and one LSTM hidden layer and one softmax layer are added thereupon to build a new LSTM-CTC model with characters as its output units.

A result of training of the word-based modeling 106 is to generate words as output units from evaluation of labeled speech signal data. A result of training of the character-based modeling 108 is to generate characters as output units for evaluation of labeled speech signal data. Exemplary word outputs (e.g., valid and frequent words from word-based modeling) are used to generate a character graph that is used to assist with character evaluation of OOV tokens. During training, a character graph is constructed by taking all of the words in the training data as valid words and constructing a character set. In this way, all of the words mapped into OOV during training can be recognized by character-based modeling while avoiding instances where character-based modeling generates invalid words. An exemplary character set may comprise standard alphabetic characters as well as any other additional characters that are known to one skilled in the art that extend vocabulary. Examples of additional characters comprise but are not limited to: capital letters used in the word-initial position, double-letter units representing repeated characters like ll, apostrophes followed by letters such as 'd, 're etc., triple letter units, numeric characters and symbols, among other examples. Hot-words may be added to a listing of valid words, where a character graph may be reconstructed based on an updated valid word listing. This may resolve issues with subsequently added hot words without requiring re-training of a speech recognition model.

In some examples, evaluation of speech signal data by the character-based modeling 108 is executed on a portion of a speech signal that is labeled as an OOV token. This may help ensure that the hybrid neural network model is efficiently processing a speech signal and reducing latency resulting from executing multiple different models to evaluate an entire speech signal. Processing relating to scoring/ranking outputs from neural network modeling is known to one skilled in the field of art.

As referenced above, process flow 100 comprises a graphical representation of processing by the hybrid neural network model for speech recognition processing, where the graphical representation is illustrated in the word sequence result 106a and the character sequence result 108a (as well as the hybrid decision area 108b). As shown in the graphical representation, the word-based modeling 106 (e.g., word-based CTC) generates a sequence "play artist OOV" as the word sequence result 106a. Further breaking down the analysis of the speech signal by the word-based modeling 106, the word sequence result 106a comprises 2 words ("play" and "artist") as well as a third portion of the speech signal identified as an OOV token. If the output word sequence result 106a does not contain any OOV token, then the word sequence result 106a, generated from the word-based modeling 106, is used as the speech recognition result (e.g., ASR result). In examples, only a portion of the speech signal that corresponds with the OOV token, is analyzed using the character-based modeling 108, where characters (associated with spikes identified from analysis of the shared hidden layer structure 104) may be identified as shown in character sequence result 108a. That portion of speech signal is identified as hybrid decision area 108b, identifying a portion of the speech signal that receives overlapping evaluation by the word-based modeling 106 and the character-based modeling 108. In examples where multiple OOV tokens are detected in a speech signal, the hybrid decision area 108b may expand to evaluate multiple portions of the speech signal or alternatively multiple hybrid decision areas are identified in an exemplary character sequence result. In alternative examples, an entire portion of the speech signal is propagated for character-based modeling 108. This may occur in examples where the word-based modeling 106 and the character-based modeling 108 are not running in parallel and where latency and efficiency are not a primary concern. A non-limiting example of such a scenario is model training.

In the example shown for character sequence result 108a, the OOV token, analyzed in the hybrid decision area 108b, is identified to correspond with the string of characters "r" "a" "t" "a" "t" "a" "t". Exemplary output(s) through character-based modeling 108 may be single character/letter units or multi-character/letter units (e.g., double-letter units, triple-letter units). Using the context information (retrieved from the shared hidden layer structure 104) may also be utilized to make the prediction of the characters better. In some instances, the string of characters may be output as detected. In other examples, subsequent processing of the character string may comprise collapsing the characters into one or more words. Collapsing of the character string may occur only on the portion of speech signal that is evaluated as the hybrid decision area 108b. This is because the word-based modeling 106 and the character-based modeling 108 may be running in parallel, where evaluation is focused on the OOV token data. This additional speech recognition processing may be employed to identify formulations of words (e.g., demarcations between characters) for the refinement of the character sequence result 108a. The character sequence result 108a is a word sequence "play artist ratatat".

The final speech recognition result (e.g., ASR result) is obtained by replacing the OOV token generated from the word-based CTC with the word generated from the character-based CTC that has the largest time overlap with the OOV token. An output of "ratatat" from the character-based CTC is the segment overlapped with the OOV token most, and is then used to replace the OOV token to form a final speech recognition result (e.g., ASR output result) of the hybrid CTC as "play artist ratatat". The speech recognition result may be propagated to a computing device (e.g., client computing device in a system/service example) and/or specific application/service that corresponds with receipt of the speech signal.

The exemplary hybrid neural network model for speech recognition improves the accuracy of the word-based modeling because it may only replace the OOV tokens generated from the word-based modeling without changing any other word outputs. With an exemplary shared-hidden-layer structure, the alignments of words from the word-based modeling and the character-based modeling are well synchronized. This may achieve greater accuracy (and reduce WER) as compared with traditional word-based CTC modeling for speech recognition processing.

FIGS. 2A-2B illustrate exemplary methods respectively related to training of speech recognition modeling and application of a trained speech recognition model for decoding a speech signal, with which aspects of the present disclosure may be practiced. Examples described herein pertain to training and execution of an exemplary hybrid neural network model for speech recognition processing, as described in the description of process flow 100, as well as an exemplary mixed unit speech recognition model as referenced in the foregoing.

In the hybrid neural network model (e.g., hybrid CTC model) examples, the exemplary shared hidden layer structure is used to align the word segments between the word-based CTC and the letter-based CTC so that the OOV token lookup algorithm can work. The exemplary hybrid CTC runs the word-based and the character-based CTCs simultaneously during testing by using the shared-hidden-layer constraint to help the time synchronization of word outputs from those two CTC models. While such processing presents significant improvement over word-based neural network models for speech recognition, this design can be improved because the blank symbol dominates most of the frames, and therefore the time synchronization is not as reliable as it could be. Although the shared-hidden-layer constraint helps to synchronize the word outputs from the word and character/letter-based CTC model, time synchronization may sometimes fail.

As an alternative example to the hybrid neural network model for speech recognition processing, a mixed unit speech recognition model is developed and trained to generate a mixed word and character sequence during decoding of a speech signal. Instead of generating and replacing an OOV token during decoding of a speech signal, detection and replacement of OOV tokens is done during training. In this way, there is no OOV generated during decoding. The sequence generated during decoding is a mixture word and character sequence. When a spoken word is an OOV word, an exemplary system employing a mixed unit speech recognition model emits a letter sequence from which a word is generated by collapsing all those letters. An exemplary hybrid CTC model is limited in this capacity because the two CTCs are running in parallel without a perfect time synchronization. A direct solution is to train a single CTC model with mixed units.

FIG. 2A illustrates an exemplary method 200 related to training of speech recognition modeling with which aspects of the present disclosure may be practiced. As an example, method 200 may be executed by an exemplary computing device (or computing devices) and/or system such as those shown in FIGS. 3A-5. Operations performed in method 200 may correspond to operations executed by a system and/or service that executes computer programs, APIs, neural networks or machine-learning processing and semantic and entity understanding modeling, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 relates to training of speech recognition modeling (neural network modeling), where trained modeling may be exposed for real-time (or near real-time) decoding of a speech signal. Exemplary speech recognition modeling, referenced in method 200 (and subsequently method 220 of FIG. 2B) comprise the hybrid neural network model for speech recognition processing and the mixed unit speech recognition model.

Method 200 begins at processing operation 202, where training data is managed for an exemplary speech recognition model. As referenced in the foregoing description, an exemplary hybrid neural network model for speech recognition processing may comprise word-based modeling (e.g., word-based CTC modeling) and character-based modeling (e.g., character-based CTC modeling). In an exemplary hybrid neural network model for speech recognition processing, the word-based model and character-based model may be trained individually, where the word-based model is trained using words as output and the character-based model is training using characters as output (ultimately from OOV tokens that correspond to valid words).

An acoustic-to-word CTC model may be constructed by modeling a plurality of most frequent words (e.g., 27,000 words) in a set of training data. Size of the set of training data may vary according to developer specifications. In one example, a test set may comprise a plurality of utterances (e.g., 5000). An exemplary hybrid neural network model for speech recognition processing may be generated by building character-based modeling on top of shared hidden LSTM layers of a word-based modeling. For instance, on top of the shared hidden layers, a new LSTM hidden layer and a softmax layer are added to model letter (single, double, or triple-letters) outputs for the character-based modeling. Attention modeling may be applied to boost the performance of the character-based modeling.

Exemplary character-based modeling (character-based CTC modeling) may comprise training data that enables the character-based modeling to build one or more character sets (e.g., single-letter sets, double-letter sets, triple-letter sets) that are used for labeling portions of speech signals for prediction of detected OOV tokens. Training data for character-based modeling may comprise but is not limited to one-character, two-character and three-character (or letter) combinations. During training, a character graph is constructed by taking all of the words in the training data as valid words and constructing a character set. In this way, all of the words mapped into OOV during training can be recognized by character-based modeling while avoiding instances where character-based modeling generates invalid words. An exemplary character set may comprise standard alphabetic characters as well as any other additional characters that are known to one skilled in the art that extend vocabulary. Examples of additional characters comprise but are not limited to: capital letters used in the word-initial position, double-letter units representing repeated characters like ll, apostrophes followed by letters such as 'd, 're etc., triple letter units, numeric characters and symbols, among other examples. Hot-words may be added to a listing of valid words, where a character graph may be reconstructed based on an updated valid word listing. This may resolve issues with subsequently added hot words without requiring re-training of a speech recognition model.

As referenced in the foregoing description, an exemplary mixed unit speech recognition model is trained based on mixed word and character sequence units. Unlike the hybrid neural network model for speech recognition processing, training data comprising words and character sequences (e.g., sequences of multi-letters) is combined for training of a single mixed model. In one example, training data associated with the hybrid neural network model (specifically relating to word-based modeling and the character-based modeling) may be leveraged as a corpus of training data for an exemplary mixed unit speech recognition model.

Flow of method 200 may proceed to processing operation 204, where training of respective speech recognition models is initiated. Training of respective speech models may comprise detection of frequent words in a set of training data as well as mapping infrequent words to OOV tokens. Frequent words are words that are detected a threshold number of times in the training data during testing. For example, frequent words may be words detected at least ten times in the training data. In at least one other example, all other words (not detected as frequent words) may be mapped to OOV tokens (e.g., OOV output tokens). As referenced in the foregoing description, an exemplary mixed unit speech recognition model may detect OOV tokens during training so that OOV tokens are not components of a speech recognition result during decoding of a speech signal in real-time (or near real-time). This may improve processing efficiency of operations executed during decoding as well as reduce latency in speech recognition processing, for example, when an end user is waiting on speech recognition processing to occur.

Flow may proceed to processing operation 206, where training is run (executed) for respective speech recognition models. Training of an exemplary hybrid neural network model for speech recognition processing may comprise executing word-based modeling on samples of training data to generate word output sequences for testing. Exemplary word output sequences are generated by executing decoding (e.g., greedy decoding or the like) on the speech signal. Words corresponding to maximum posterior spikes in speech signal data may be identified. In further examples, training processing may comprise reducing repeated words into a single output if there is not a blank token in between such words.

If an output of an exemplary word output sequence does not contain any OOV tokens, then training of the word-based modeling portion of the hybrid neural network model is configured to use the word output sequence as an exemplary speech recognition result. In instances where an OOV token is detected in a word output sequence, the word-based modeling is trained to propagate the speech signal (and corresponding word output sequence data) to the character-based modeling portion of the hybrid neural network model for speech recognition processing. Exemplary character-based modeling may be executed for the speech signal, where another word output sequence is generated from the character-based modeling. Training, during testing of the character-based modeling, may comprise detection of a character sequence for a portion of a speech signal that corresponds to an OOV token. Processing may further be applied to generate words from character sequences. Training is applied to obtain an exemplary speech recognition result by replacing an OOV token generated from the word-based modeling with a word generated from the character-based modeling that has the largest time overlap with the OOV token. In some instances, a character sequence is not able to be turned into a complete word. However, training attempts to optimize the ability of the character-based modeling to represent character sequences as full words.

Training (processing operation 206) of an exemplary mixed unit speech recognition model may comprise generation of exemplary mixed-unit sequences of frequent words and characters (character sequences) as speech recognition output of the training data. An exemplary mixed unit speech recognition model is trained to address instances where the speech signal comprises the equivalent of an OOV token (or speech that is not recognized as a frequent word) so that OOV tokens are not output at the time of decoding. During training, speech signals of the training data are decoded (e.g., greedy decoding or the like). In examples where OOV tokens are detected in training data, an OOV token is decomposed into a mixed-unit sequence of frequent words and characters (e.g., letters). Character-sequence detection may comprise usage of character units (e.g., single-letter units, double-letter units, triple-letter units) to improve temporal modeling. Additionally, attention based modeling (as described in the foregoing description) may also be utilized to train the mixed unit speech recognition model, for example, to address inherent CTC modeling issues and optimize the ability to output word and character sequences.

As an example, consider an instance where a transcription of an utterance with a traditional word-based speech recognition model is "have you been to newyorkabc". In such an instance, training (and subsequent real-time decoding processing) would identify that the portion of the speech "newyorkabc" is an infrequent word. During training, a recognition output sequence for this utterance will be "have you been to OOV". Training processing using a mixed unit speech recognition model is configured to breakdown the OOV "newyorkabc" into frequent words (if possible) and one or more character sequences. Training (processing operation 206) is applied to identify "new york" in the utterance as a frequent word and the remaining portion as a character sequence of "abc". Training may comprise utilizing a character set (including single-letter units, double-letter units, triple-letter units) to optimize the output of characters. Therefore, the output units of an exemplary mixed-CTC model are mixed units, with both words (for frequent words) and letters (for OOV words). Continuing the above example, a mixed unit output of the OOV token may be "new york abc" where the recognition output of the utterance may be "have you been to new york a b c" (when decomposed using single-character units) or "have you been to new york abc" (when decomposed using double-character units), among other examples.

Furthermore, delimiters may be utilized to optimize training when working with mixed units. For instance, a delimiter of "$" is used to separate each word in the sentence during evaluation of training data. Such processing is useful for the collapsing mixed units (words+characters) into output word sequences. Consider the utterance example "have you been to newyorkabc". A decomposition of that utterance is decomposed sequence of "$ have $ you $ been $ to $ newyork abc $". Such processing is useful in increasing processing efficiency during execution of decoding of speech signals to generate speech recognition results in real-time (or near real-time).

Once training processing has been applied to respective speech recognition models, flow of method 200 proceeds to processing operation 208, where trained speech recognition models are exposed. Processing operation 208 comprises enabling access, for real-time (or near real-time) decoding to a trained hybrid neural network model for speech recognition processing (e.g., word-character modeling) and/or a trained mixed unit speech recognition model. In some system or service examples, applications/services may be configured to interface with exemplary speech recognition models to retrieve speech recognition results for received speech signals. For instance, application programming interfaces (APIs) may be generated and utilized to enable applications/ service to access speech recognition results and/or speech recognition models to propagate speech recognition results to exemplary applications/services.

At decision operation 210, a determination is made as to whether an update is to occur to an exposed speech recognition model. Examples of updates to speech recognition models may comprise re-training of an exposed model or update to a recognized word listing (e.g., hot-word update), among other examples. In some instances, update to training data may comprise a collection of signal data associated with propagated speech recognition results. For example, a speech recognition result may be propagated to an application/service that displays a predicted speech recognition result (or retrieves data based on the predicted speech recognition result), where usage data from the application/ service may be indictive of accuracy of a speech recognition result. In one instance, usage data may be collected from a productivity service, where the usage data pertains to a user interaction with the speech recognition result. Such data may be useful for subsequent update of training data/re-training of an exemplary speech recognition model. In examples where no update occurs to an exposed speech recognition model, flow of decision operation 210 branches NO and processing of method 200 remains idle, leaving the exposed speech recognition model available for speech recognition processing. In examples where an update is to occur to an exposed speech recognition model, flow of decision operation 210 branches YES and processing of method 200 returns to processing operation 202. At processing operation 202, training data associated with a speech recognition model may be updated and processing may occur to re-train an exemplary speech recognition model.

FIG. 2B illustrates an exemplary method 220 related to application of a trained speech recognition model for decoding a speech signal with which aspects of the present disclosure may be practiced. Method 220 is directed to usage of exemplary speech recognition models to generate speech recognition results for received speech signals. As an example, method 220 may be executed by an exemplary computing device (or computing devices) and/or system such as those shown in FIGS. 3A-5. Operations performed in method 220 may correspond to operations executed by a system and/or service that executes computer programs, APIs, neural networks or machine-learning processing and semantic and entity understanding modeling, among other examples. As an example, processing operations executed in method 220 may be performed by one or more hardware components. In another example, processing operations executed in method 220 may be performed by one or more software components. In some examples, processing operations described in method 220 may be executed by one or more applications/services associated with a web service that has access to a plurality of application/services, devices, knowledge resources, etc. In one instance, processing operations described in method 220 may be implemented by one or more components connected over a distributed network.

Method 220 begins at operation 222, where a speech signal is received. Exemplary speech signals and description of receipt of speech signals has been provided in the foregoing description (including process flow 100 of FIG. 1).

Flow of method 220 may proceed to processing operation 224, where a received speech signal is decoded. Decoding of a speech signal may comprise application of an exemplary speech recognition model (e.g., exposure/access to a trained speech recognition model). Examples of speech recognition models have been provided in the foregoing description and include an exemplary hybrid neural network model for speech recognition processing and an exemplary mixed unit speech recognition model. As referenced in the foregoing examples, an exemplary hybrid neural network model for speech recognition processing is a hybrid neural network model that is trained with CTC criterion (hybrid CTC model). An exemplary mixed unit speech recognition model is a neural network model that is trained with CTC criterion (mixed unit CTC model) to identify mixed unit (word and character sequences). In one example, decoding processing, using a trained speech recognition model, may comprise execution of greedy decoding. However, examples described herein are not so limited and other types of decoding processing, known to one skilled in the field of art, may be applied without departing from the spirit of the present disclosure.

In examples where a hybrid neural network model for speech recognition processing is utilized for evaluation of a received speech signal, flow of method 220 proceeds to processing operation 226, where an exemplary hybrid CTC model is applied. Application (processing operation 226) of an exemplary hybrid neural network model for speech recognition processing (hybrid CTC model) comprises detecting (processing operation 228) that a speech signal comprises an out-of-vocabulary (OOV) token (or OOV tokens). As described in the foregoing description, the hybrid neural network model is trained to propagate the speech signal for character-based evaluation of the OOV token. Propagation may comprise transmitting a detected word sequence that may require subsequent processing to resolve a portion of the word sequence (e.g., OOV token).

A character-based neural network model may be implemented as an auxiliary model (of a hybrid neural network model) for the evaluation of speech signal corresponding with detection of OOV tokens. During decoding of a speech signal, a primary word-based model emits a word sequence, and the output of character-based auxiliary model is consulted at a segment where the word-based model emits an OOV token. The character-based neural network model is implemented to generate (processing operation 230) a character sequence for the OOV token. Generation of an exemplary character sequence, including processing operations for preparing the character sequence for output as a speech recognition result, has been described in the foregoing description.

Flow of method 220 may proceed to processing operation 238, where a speech recognition result is output from the hybrid neural network model for speech recognition processing (e.g., hybrid CTC model). Processing operations for output of an exemplary speech recognition result (e.g., ASR result) may comprise aggregating a generated character sequence (for the OOV token) within the word sequence output from word-based modeling by the hybrid neural network model. In some examples, processing operation 238 may comprise collapsing the character sequence into one or more specific output units for the OOV token, wherein an output unit is included in the speech recognition result. An output speech recognition result may be propagated to an application/service for subsequent processing, which may comprise surfacing the speech recognition result through a user interface of an exemplary application/service.

In alternative examples of method 220, an exemplary mixed unit speech recognition model is applied (processing operation 232) to decode a received speech signal. Application (processing operation 232) of an exemplary mixed unit speech recognition model (mixed unit CTC model) comprises generating (processing operation 234) a mixed unit word-character sequence for the speech signal. A mixed unit word-character sequence (or mixed word and character sequence) is generated (processing operation 234) based on evaluation of the speech signal by the mixed unit speech recognition model. The mixed unit speech recognition model is trained based on a mix of words and character sequences. This may eliminate the need for detection of OOV tokens at a time of real-time (or near real-time decoding) of a speech signal.

Processing flow, during application of the mixed unit speech recognition model, may proceed to processing operation 236, where the mixed word and character sequence is decomposed. Processing operations related to decomposition of an exemplary mixed word and character sequence have been provided in the foregoing description (including the description of method 200; FIG. 2A). Flow of method 220 may proceed to processing operation 238, where a speech recognition result is output from the mixed unit speech recognition model (e.g., mixed unit CTC model). An output speech recognition result may comprise the decomposed mixed word and character sequence. In some examples, processing operation 238 may comprise collapsing, into one or more output units, the character sequence of the decomposed mixed word and character sequence. An exemplary collapsed character sequence may be output within the speech recognition result. An output speech recognition result may be propagated to an application/service for subsequent processing, which may comprise surfacing the speech recognition result through a user interface of an exemplary application/service.

Figure 3:
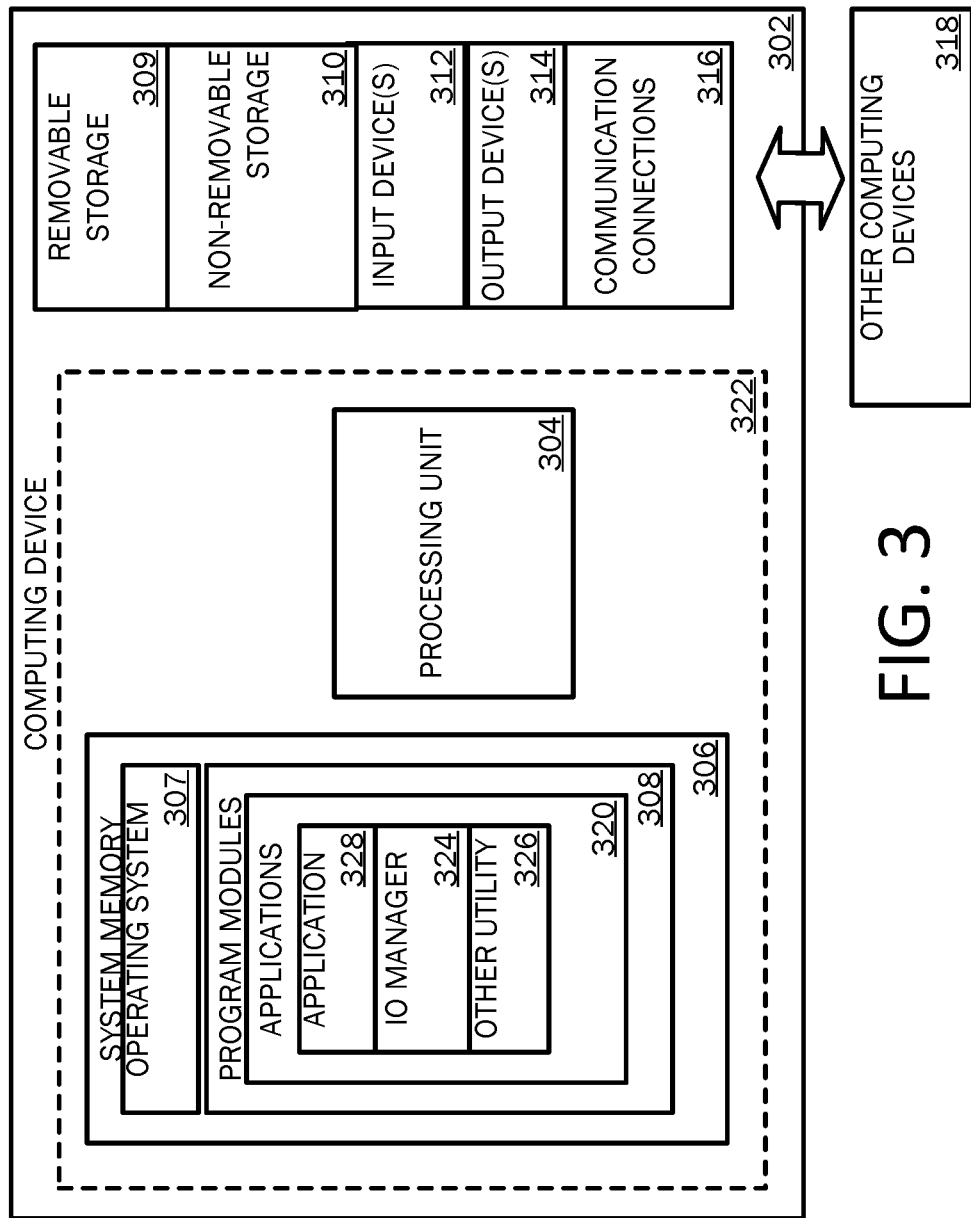
FIG. 3 is a block diagram illustrating an example of a computing device with which aspects of the present disclosure may be practiced.
Figure 4A:
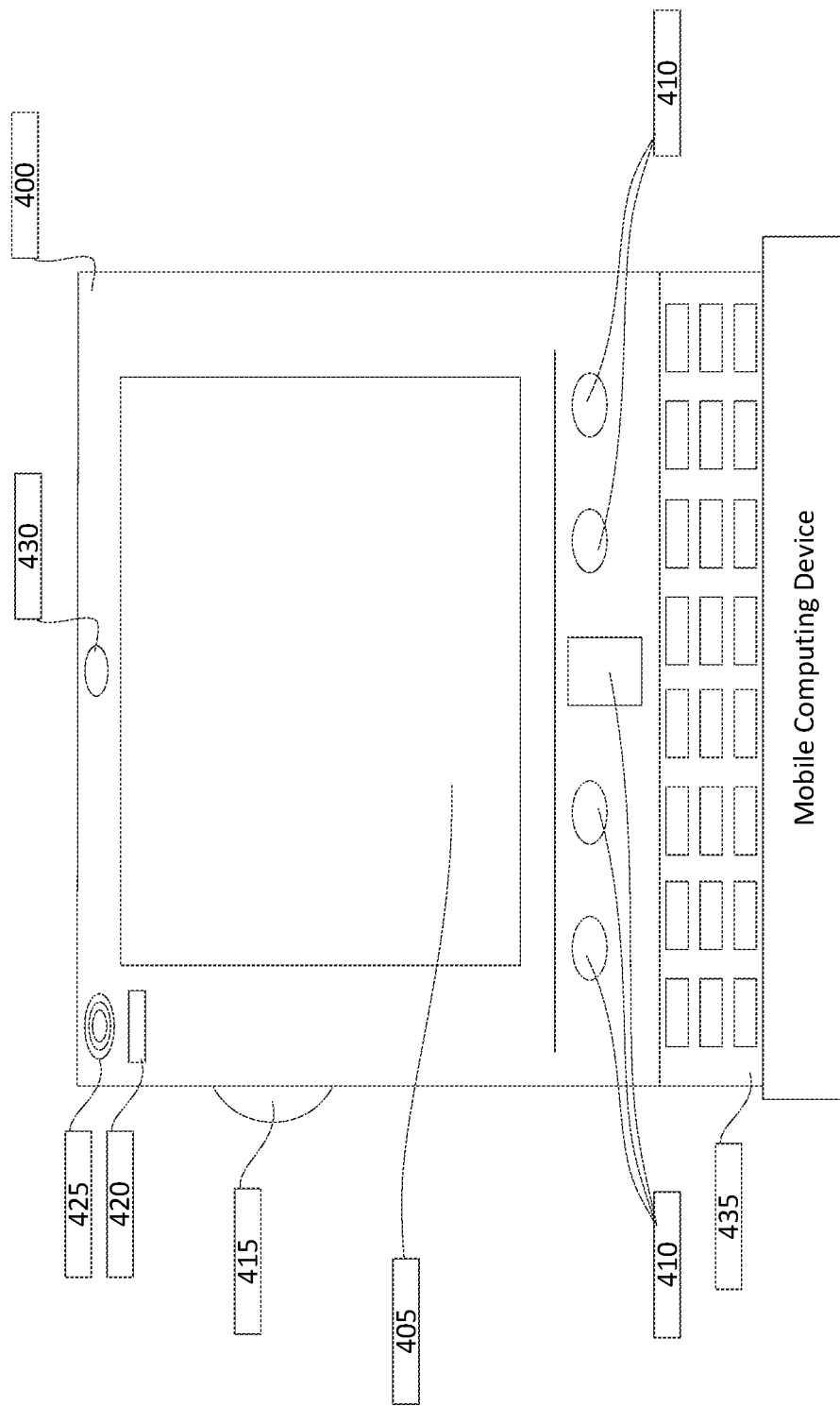
FIGS. 4A and 4B are simplified block diagrams of a mobile computing device with which aspects of the present disclosure may be practiced.
Figure 4B:
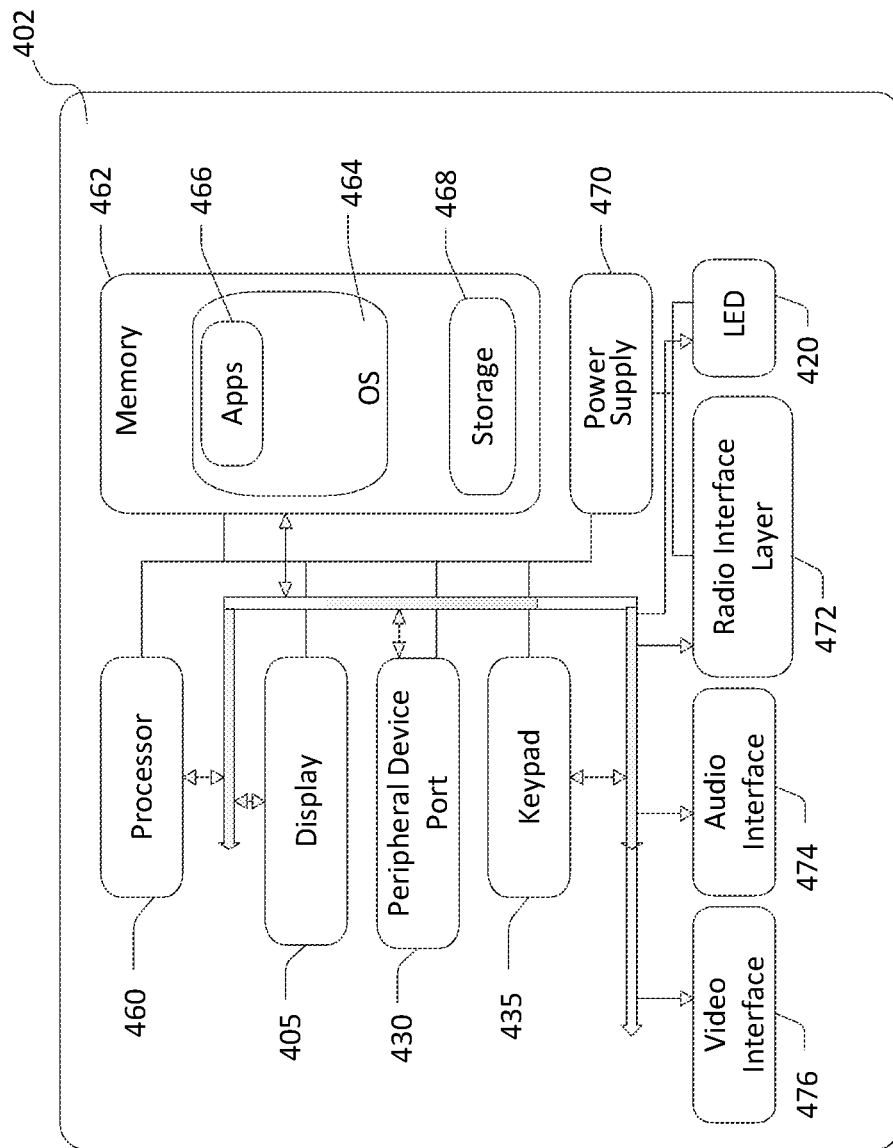
Figure 5:
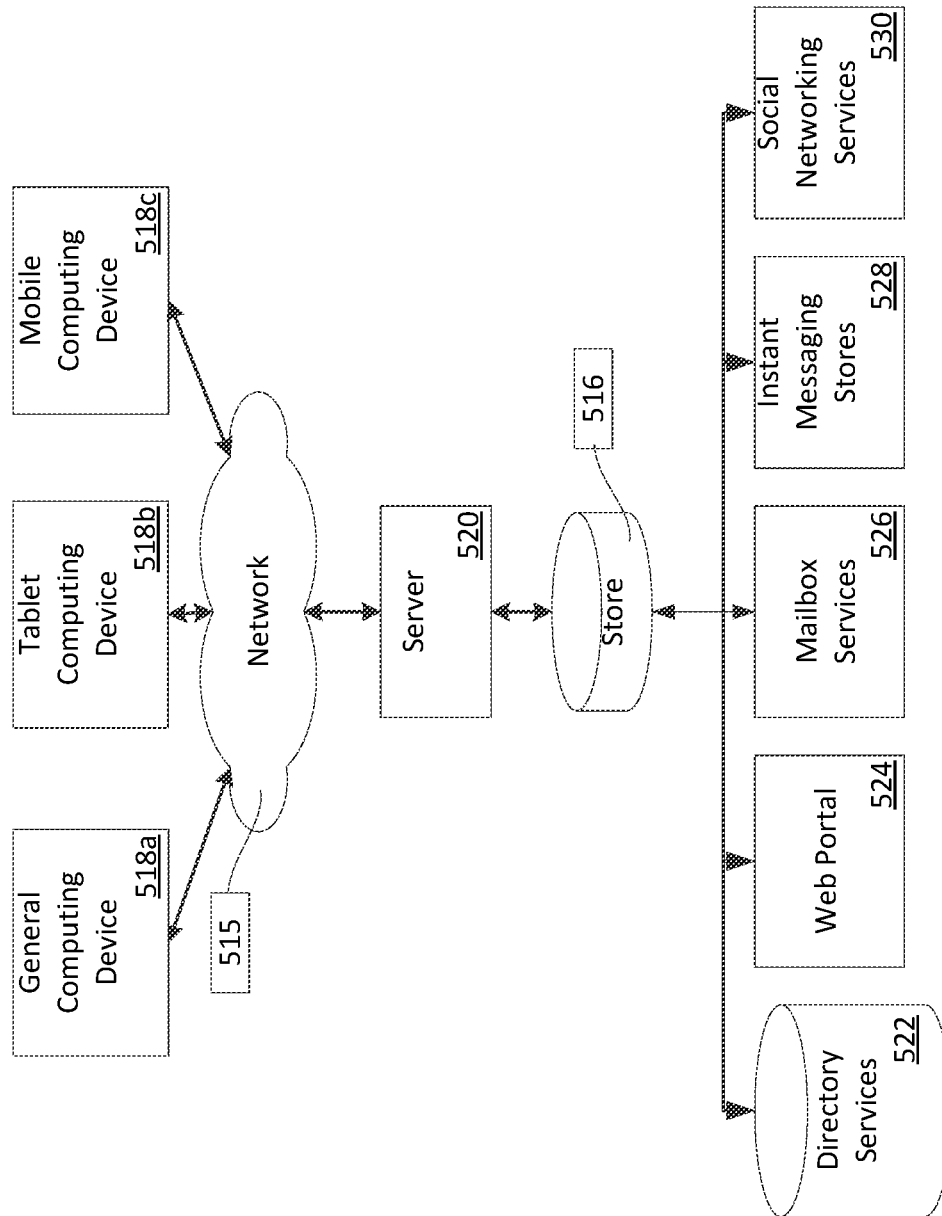
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for training of speech recognition modeling and application of a trained speech recognition model for decoding a speech signal. Operations described herein are configured to improve processing efficiency of computing devices and associated applications/services as described herein, among other technical advantages. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for training of speech recognition modeling and application of a trained speech recognition model for decoding a speech signal. Operations described herein are configured to improve processing efficiency of computing devices and associated applications/services as described herein, among other technical advantages. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for training of speech recognition modeling and application of a trained speech recognition model for decoding a speech signal. Operations described herein are configured to improve processing efficiency of computing devices and associated applications/services as described herein, among other technical advantages. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   detecting that a speech signal comprises an out-of-vocabulary (OOV) token using a word-based language model;
   propagating the speech signal to a character-based language model for character-based evaluation only when the OOV token is detected in the speech signal by the word-based language model;
   generating a character sequence for the OOV token; and
   outputting a speech recognition result for the speech signal that comprises the generated character sequence for the OOV token.

2. The method of claim 1, wherein the speech signal is processed using a hybrid neural network model that comprises an acoustic-to-word model for detection of the OOV token and character-based auxiliary model evaluation for evaluation of the OOV token.

3. The method of claim 2, further comprising: training the hybrid neural network model based on processing associated with the speech recognition result.

4. The method of claim 3, wherein the training further comprises receiving, from a productivity service, usage data associated with an interaction with the speech recognition result and updating training data of the hybrid neural network model based on the usage data.

5. The method of claim 2, wherein the hybrid neural network model is a hybrid Connectionist Temporal Classification (CTC) model that comprises an acoustic-to-word CTC model for evaluation of the speech signal and a character-based CTC model for evaluation of the OOV token.

6. The method of claim 5, wherein the hybrid neural network model is a hybrid Connectionist Temporal Classification (CTC) model that comprises an acoustic-to-word CTC model is trained to identify frequent words, and wherein the OOV token is generated when the speech signal is identified as an infrequent word that is not recognized by the acoustic-to-word CTC model.

7. The method of claim 1, further comprising: collapsing the character sequence into an output unit for the OOV token, wherein the outputting outputs the output unit in the speech recognition result.

8. The method of claim 1, wherein the outputting comprises propagating the speech recognition result to an application or productivity service.

9. A method comprising:
receiving a speech signal;
decoding the speech signal using a mixed unit speech recognition model that is trained based on word and character sequences;
generating, for the speech signal, a mixed word and character sequence based on an evaluation of the speech signal by the mixed unit speech recognition model, wherein the mixed unit speech recognition model applies a word-based language model to detect an out of vocabulary (OOV) token and applies a character-based language model to evaluate the OOV token only when the OOV token is detected in the speech signal by the word-based language model;
decomposing the mixed word and character sequence; and
outputting a speech recognition result for the speech signal that comprises the decomposed mixed word and character sequence.

10. The method of claim 9, further comprising: collapsing the character sequence of the decomposed mixed word and character sequence, wherein the speech recognition result, output in the outputting, comprises the collapsed character sequence.

11. The method of claim 9, wherein the mixed unit speech recognition model is a mixed Connectionist Temporal Classification (CTC) model.

12. The method of claim 9, wherein the speech signal is received during real-time execution of an application or service.

13. The method of claim 9, wherein the outputting comprises propagating the speech recognition result to an application or service for subsequent processing.

14. The method of claim 9, further comprising: updating training data for the mixed unit speech recognition model based on usage data, of the speech recognition result, that is associated with an application or service.

15. A system comprising:
at least one processor; and
a memory, operatively connected with the at least one processor, storing computer-executable instructions that, when executed by the at least one processor, causes the at least one processor to execute a method that comprises:
receiving a speech signal;
decoding the speech signal using a mixed unit speech recognition model that is trained based on word and character sequences;
generating, for the speech signal, a mixed word and character sequence based on an evaluation of the speech signal by the mixed unit speech recognition model, wherein the mixed unit speech recognition model applies a word-based language model to detect an out of vocabulary (OOV) token and applies a character-based language model to evaluate the OOV token only when the OOV token is detected in the speech signal by the word-based language model;
decomposing the mixed word and character sequence; and
outputting a speech recognition result for the speech signal that comprises the decomposed mixed word and character sequence.

16. The system of claim 15, wherein the method, executed by the at least one processor, further comprises: collapsing the character sequence of the decomposed mixed word and character sequence, wherein the speech recognition result, output in the outputting, comprises the collapsed character sequence.

17. The system of claim 15, wherein the mixed unit speech recognition model is a mixed Connectionist Temporal Classification (CTC) model.

18. The method of claim 15, wherein the speech signal is received during real-time execution of an application or service.

19. The method of claim 15, wherein the outputting comprises propagating the speech recognition result to an application or service for subsequent processing.

20. The system of claim 15, wherein the method, executed by the at least one processor, further comprises: updating training data for the mixed unit speech recognition model based on usage data, of the speech recognition result, that is associated with an application or service.

* * * * *